United States Patent [19]

Temes

[11] 3,725,828

[45] Apr. 3, 1973

[54] ASYMMETRICAL LOSS-POLE MECHANICAL FILTER

[75] Inventor: Gabor C. Temes, Los Angeles, Calif.

[73] Assignee: Collins Radio Company, Dallas, Tex.

[22] Filed: Mar. 13, 1972

[21] Appl. No.: 234,182

[52] U.S. Cl. .......... 333/71, 333/30
[51] Int. Cl. .......... H03h 9/26
[58] Field of Search .......... 333/71, 30

[56] References Cited

UNITED STATES PATENTS

| | | | |
|---|---|---|---|
| 3,389,351 | 6/1968 | Trzeba et al. | 333/71 |
| 3,440,574 | 4/1969 | Johnson et al. | 333/71 X |

*Primary Examiner*—Rudolph V. Rolinec
*Assistant Examiner*—Marvin Nussbaum
*Attorney*—Henry K. Woodward et al.

[57] ABSTRACT

An electromechanical filter of disc type in which the frequency response for a given passband may be varied to achieve a desired characteristic by appropriately shifting loss-poles. The filter includes at least one four-disc resonant section including first coupling wire means attached to the peripheries of each of said discs, second coupling wire means attached to the first and fourth discs and bridging the second and third discs, and third coupling wire means attached to the first and third discs and bridging the second disc. A fourth coupling wire means may be attached to the second and fourth discs and bridging the third disc.

6 Claims, 11 Drawing Figures

ASYMMETRICAL LOSS-POLE MECHANICAL FILTER

This invention relates generally to mechanical filters, and in particular to mechanical filters employing multiple resonant discs and coupling wires.

Electromechanical filters comprising parallel, spaced, mechanically resonant discs supported by acoustical coupling wires bonded to the disc peripheries have been known since the late 1940's. U. S. Pat. No. 2,615,981 and No. 2,717,361 to Doelz, for example, illustrate such filters. While exhibiting improved frequency response characteristics as compared with electrical filters, these early networks had limited selectivity and possessed undesirable phase responses in their passbands, due to the network's having all of their frequency response attenuation-poles at zero and infinite frequencies. By adding "bridging wires" to couple nonadjacent resonators while bridging one intermediate resonator, the performance of the disc-wire filters has been improved considerably. Such filters are disclosed in U. S. Pat. No. 3,135,933 to Johnson and U. S. Pat. No. 3,440,574 to Johnson et al. Further, by bridging two adjacent resonators as taught in U. S. Pat. No. 3,439,295 to Bise, attenuation poles may be provided on either side of the filter passband. However, heretofore, there has been no way to design a mechanical filter with frequency response having attenuation poles or loss-poles above and below the passband but unsymmetrical with respect to the center frequency. Similarly, no design technique was available for designing mechanical filters with arbitrarily located complex loss-poles.

In accordance with the present invention, a novel electromechanical filter is provided in which the frequency response for a given passband may be varied to achieve a desired characteristic by appropriately shifting the loss-poles. For example, with the present invention a sharper response may be provided on either side of the passband or the delay characteristics within the passband may be varied with respect to the center frequency of the passband. This added design capability enables one to tailor the normal frequency response of a mechanical filter to meet the needs of particular applications.

A feature of the invention is the use of a four-disc resonant section in which coupling wires bridge the inner two discs as taught by Bise, supra. A novel feature of the invention is the employment of one or more bridging wires to couple an outer disc of the four-disc section to one of the inner discs while bridging the other inner disc. This additional coupling wire or wires adds loss-poles to the filter response which are asymmetric with respect to the passband center frequency.

These and other objects and features of the invention will be more fully understood from the following detailed description and appended claims when taken with the drawings, in which:

FIGS. 3*a*–3*f* illustrate frequency response characteristics of mechanical filters of the prior art and in accordance with the present invention.

Figure 5:
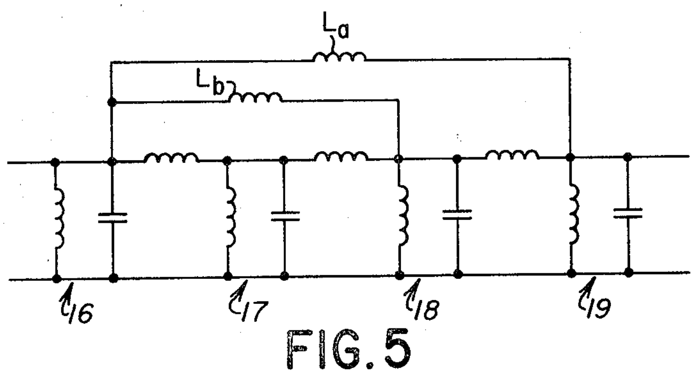
Figure 4A:
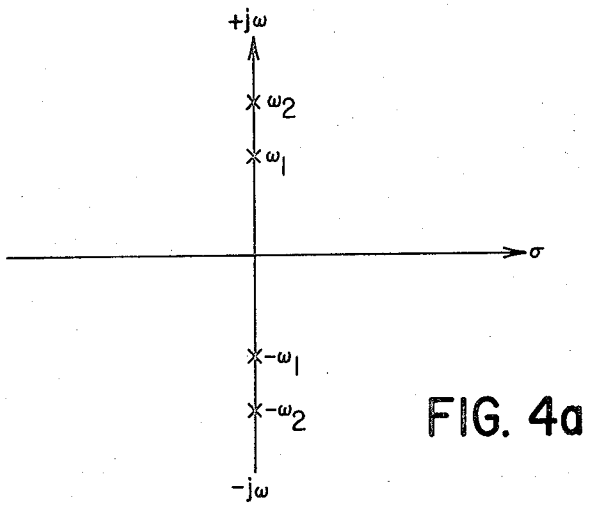
Figure 4B:
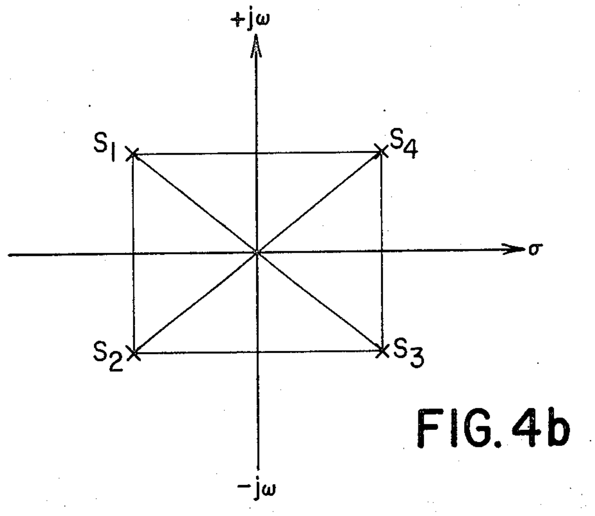

FIGS. 4*a* and 4*b* are graphs illustrating frequency attenuation-pole response available with the present invention; and FIG. 5 is the equivalent circuit for a filter in accordance with the present invention.

Figure 1:
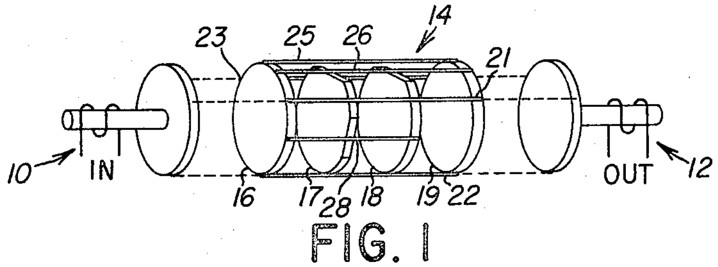
FIG. 1 is an illustrative perspective view of a mechanical filter in accordance with the present invention.

Referring now to the drawings, FIG. 1 illustrates in perspective a mechanical filter in accordance with the present invention. As with conventional mechanical filters, the filter comprises input transducer means 10 at one end of the filter for converting electrical signals into mechanical vibrations, and a second transducer means 12 at the other end of the filter for converting mechanical vibrations back to electrical energy. Between the input and output transducers are a number of acoustically resonant discs (shown by dotted lines) including a four-disc segment shown generally at 14 and including discs 16, 17, 18, and 19. Supportingly attached to the peripheries of each of the discs is a first set of coupling wires 21, 22, and 23. Conventionally, these wires provide the structural integrity of the filter in addition to providing acoustical coupling between adjacent discs. Additional coupling wires 25 and 26 couple the outer discs 16 and 19 while bridging discs 17 and 18. The bridging may be facilitated by the removal of a small peripheral portion of discs 17 and 18. The bridging wires 25 and 26 may provide attenuation poles on both sides of the passband of the filter, in accordance with the teachings of Bise U.S. Pat. No. 3,439,295, supra.

In accordance with the present invention, at least one additional coupling wire 28 is provided between outer disc 16 and inner disc 18 while bridging inner disc 17. A similar coupling wire may be provided between inner disc 17 and outer disc 19, bridging inner disc 18, but only one such coupling wire is necessary to accomplish the results of the present invention.

Figure 2:
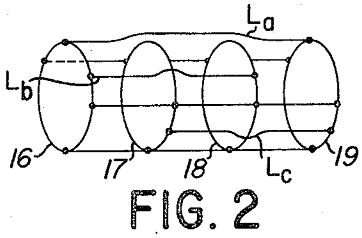
FIG. 2 is a perspective view of a four-disc section employed in the filter of FIG. 1 with illustrative coupling wires.

The improvements in the frequency response characteristics available with the filter in accordance with the present invention are illustrated in the curves of FIGS. 3*a*–3*f*, taken with disc structure of FIG. 2. In FIG. 2 the four-disc segments 16, 17, 18, and 19 of FIG. 1 is illustrated in perspective with the wire $L_a$ coupling the outer disc 16 and inner disc 18 and bridging disc 17, and the wire $L_c$ coupling inner disc 17 to outer disc 19 and bridging inner disc 18. Wires $L_a$ and $L_b$ correspond to the inductors $L_a$ and $L_b$ of the equivalent circuit of FIG. 5.

Figure 3A:
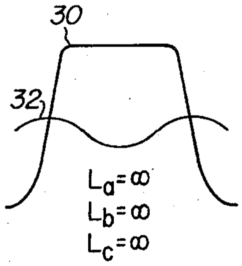

In FIG. 3*a* the amplitude response characteristic 30 and the delay characteristic 32 are shown for a prior art electromechanical filter in which no bridging wires are employed, such as shown by Doelz, supra ($L_a = \infty$, $L_b = \infty$, $L_c = \infty$). It will be noted that there are no attenuation poles on the response curve 30 on either side of the passband and only a single minimum is located at the center frequency of the delay characteristic curve 32.

Figure 3B:
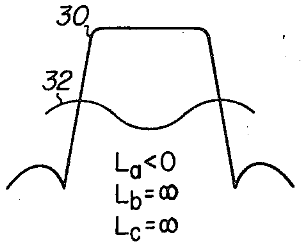

In FIG. 3b coupling wire $L_a$ is provided in accordance with the teachings of Bise and has an effective negative impedance. It will be noted that, in accordance with the teaching of Bise, attenuation poles are provided on both sides of the passband as noted by curve 30. Neither wire $L_b$ nor wire $L_c$ is provided in FIG. 3*b*.

Figure 3C:
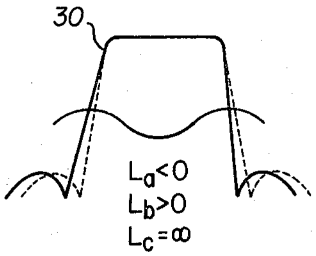
Figure 3D:
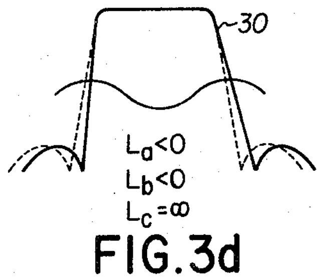

In accordance with the present invention, a shift in the response characteristics for a given bandwidth may be achieved by adding the coupling wire $L_b$ as illustrated by curve 30 in FIG. 3*c*. For reference purposes, the dotted line represents the conventional frequency response illustrated in FIG. 3*b*. It will be noted that the attenuation poles are shifted down frequency thereby providing a steeper gradient or greater selectivity at the upper region of the bandpass. In FIG. 3*d* a reverse shift is provided by making $L_b$ less than zero (negative impedance). Thus, as illustrated in FIGS. 3*c* and 3*d* greater selectivity may be provided on one side of the passband through the provision of a coupling wire $L_b$ in accordance with the present invention. The two attenuation poles may be moved independently of each other, by judicious choice of the element values, or wire lengths.

Figure 3E:
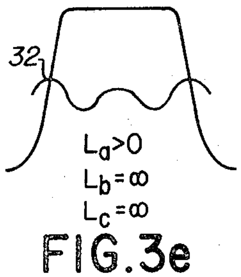
Figure 3F:
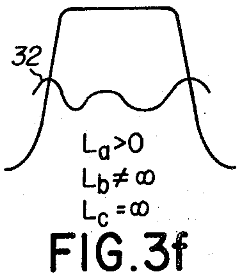

Shifts in the delay equalization curve also may be provided as illustrated in FIGS. 3*e* and 3*f*. In FIG. 3*e*, $L_a$ is greater than zero with neither $L_b$ nor $L_c$ present, in accordance with the Bise teachings, supra. It will be noted that the delay curve 32 includes two minima. By adding the coupling wire $L_b$ the central lobe of the delay curve 32 may be shifted in frequency, as illustrated in FIG. 3*f*.

Thus, through use of Bise coupling wires with negative impedance a shift in the amplitude response may be provided with the additional coupling wire in accordance with the present invention. When the Bise coupling wires have a positive impedance, a shift in delay response may be accomplished with the additional coupling wire in accordance with the present invention.

When the additional coupling wire $L_b$ (or $L_c$) is included, the circuit can be used to realize two pairs of real frequency loss-poles at $\pm j\omega$, and $\pm j\omega_2$, as illustrated in FIG. 4*a*, which as stated in connection with FIGS. 3*c* and 3*d*, need not be located symmetrically with respect to the passband. Alternatively, for a different choice of element values, the circuit will realize four complex loss-poles $s_1$, $s_2$, $s_3$ and $s_4$ having symmetry with respect to the origin as illustrated in FIG. 4*b*. The positions of these complex loss-poles need not be symmetric with respect to the passband. This freedom in the location of the poles realized by the filter is afforded by the additional element $L_b$ or $L_c$ described in the invention.

The design procedure for the mechanical filter utilizing $L_b$ or $L_c$ is straightforward using the equivalent circuit illustrated in FIG. 5. With reference to FIG. 5, each disc is illustrated as an inductor and a capacitor connected in parallel with the coupling wires illustrated as inductive elements.

The design of the circuit of FIG. 5 reveals that all elements of the circuit are real for either real frequency loss-poles as shown in FIG. 4*a*, or complex loss-poles as illustrated in FIG. 4*b*. Furthermore, all element values are independent of each other. It is this independence which makes it possible to realize loss or delay frequency responses having no symmetry with respect to the passband.

The element values are not necessarily positive for all design specifications. However, this is equally true for ladder circuits and other configurations of practical importance, and does not decrease the technical usefulness of the invention.

The mechanical filter in accordance with the present invention gives latitude to the designer for a given bandpass requirement and is straightforward in design using well-known techniques. While the invention has been described with reference to a specific embodiment, the description is illustrative and is not to be construed as limiting the invention. Various modifications and changes may occur to those skilled in the art without departing from the spirit and scope of the invention as defined by the appended claims.

I claim:

1. An electromechanical filter comprising a plurality of mechanically resonant discs in spaced parallel relationship, a plurality of coupling wires attached to the peripheries of said discs, first transducer means for applying an input signal to said filter, second transducer means for receiving an output signal from said filter, said plurality of discs including at least one four-disc section including first coupling wire means attached to the outer two discs of said section and bridging the inner two discs of said section, and second coupling wire means attached to one outer disc and one inner disc of said section and bridging one inner disc of said section.

2. An electromechanical filter as defined by claim 1 wherein said second coupling wire means includes one coupling wire attached to said one outer disc and said one inner disc.

3. An electromechanical filter as defined by claim 1 and further including a third coupling wire means attached to the other outer disc and the other inner disc of said section and bridging one inner disc of said section.

4. An electromechanical filter as defined by claim 3 wherein said second coupling wire means and said third coupling wire means each comprise one coupling wire.

5. For use in an electromechanical filter, a disc section comprising first, second, third, and fourth discs in spaced parallel arrangement, first coupling wire means attached to the peripheries of each of said discs, second coupling wire means attached to said first and fourth discs and bridging said second and third discs and third coupling wire means attached to said first and third discs and bridging said second disc.

6. A disc section as defined by claim 5 and further including fourth coupling wire means attached to said second and fourth discs and bridging said third disc.

* * * * *